Patented June 23, 1931

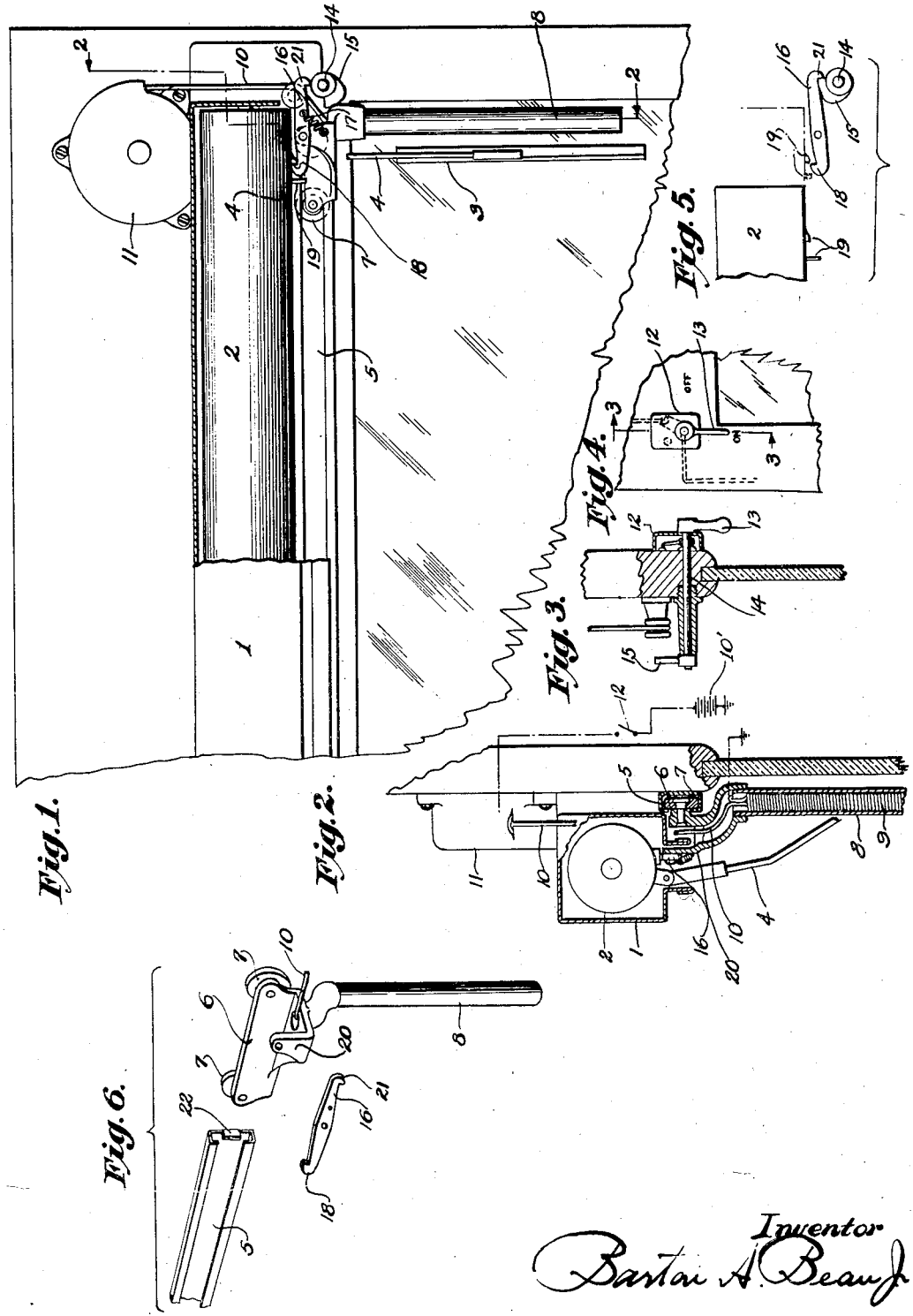

1,811,819

UNITED STATES PATENT OFFICE

BARTON A. BEAN, JR., OF WILLIAMSVILLE, NEW YORK, ASSIGNOR TO TRICO PRODUCTS CORPORATION, OF BUFFALO, NEW YORK

WINDSHIELD CLEANER

Application filed July 1, 1927. Serial No. 202,856.

This invention relates to a windshield cleaner especially adapted for the removal of frozen or congealed moisture, rain, sleet, or snow from the windshield glass.

Various attempts have been made to provide a practical windshield cleaner which will operate efficiently during cold inclement weather when there frequently accumulates on the exterior surface of the windshield a coating of ice which the ordinary windshield wiper fails to remove unless the frozen coating is loosened by the application of heat in one way or another. It has been suggested that warm air be directed against the windshield to thaw such icy coating. Other suggestions have included the heating of the windshield from within by an electric heater or by the heating of the wiper blade by means of an electrical heating resistance. This last named idea has been incorporated in various forms of wipers requiring a reconstruction of the wiper member and placing a constant additional load upon the wiper motor in moving the electrical heater embodiment back and forth when the heater is inactive in warmer weather. Furthermore, in a wiper element embodying an electrical heater it is necessary to renew the wiping rubber or felt from time to time as the same wears, and, when the wiper is reconstructed to incorporate the heater, such repair or renewal requires the services of an expert machinist, thereby placing upon the user an additional item of expense.

The present invention has for an object to provide a windshield cleaner with an electrical heater which will, during the major portion of the year, remain inoperative and to one side of the field of vision through the windshield, but which may readily be coupled or connected to the windshield wiper element to move therewith and effect a melting of the icy coating on the windshield when called upon to do so.

A further object of the invention is to provide a windshield cleaner with a heating device which during the normal operation of the windshield will remain in a parked or idle position to one side of the field of vision without placing any additional burden upon the windshield cleaner motor and which may automatically be actuated along with the windshield wiper when said heater is energized so that the cleaner motor will only be called upon to bear such additional burden only during the limited time intervals in which rain or sleet accumulates on the windshield in the form of an icy coating.

A still further object of the invention is to provide a windshield cleaner with an electrical heating device for movement with the wiper which will not require any special reconstruction of the wiper element and which will not interfere with the proper operation of the same, or its replacement or repair.

Another object of the invention is to provide a windshield cleaner with a normally inoperative and parked heating device which when energized or heated will simultaneously be adapted for movement from its parked position by, and during the normal operation of, the wiper element.

The invention further resides in the salient features of construction and the novel arrangements and combinations of parts hereinafter described and claimed, reference being made to the accompanying drawings wherein, Fig. 1 is a fragmentary front elevation of a cleaner-equipped windshield, with portions shown in section and other portions broken away, embodying the present invention;

Fig. 2 is an irregular section through the windshield and cleaner about on line 2—2 of Fig. 1;

Fig. 3 is a detailed section about on line 3—3 of Fig. 4 with portions beyond being omitted, and showing more clearly the control for energizing the heater and coupling the same to the windshield wiper;

Fig. 4 is a fragmentary view from within the automobile showing a control switch of simple form;

Fig. 5 is a fragmentary and schematic showing exemplifying the heater-coupling arrangement; and Fig. 6 is a detailed perspective view of the disassembled heating device, its track, and its coupling member.

In the preferred embodiment a windshield cleaner of the reciprocatory type is shown, the same comprising a casing 1 and a reciprocally mounted member 2 which may be considered as the carrier for the usual wiper element 3, said wiper element being suspended from the carrier by its arm 4, so that during the normal operation of the windshield cleaner motor said wiper 3 will be moved back and forth across the windshield glass in a substantially straight line or path.

Mounted along the upper edge of the windshield is a track 5 of substantially channel formation which supports the heater carriage 6 the latter being provided with spaced supporting wheels 7 which engage in and move along the track 5 a distance coextensive with the path of movement of the wiper 3. Depending from the carriage 6 is the heating device which embodies a tubular casing 8 and an enclosed electrical resistance element 9 which may have one side of the electrical circuit grounded and the opposite side connected by a circuit wire 10 to a source of electrical energy 10'. As the heater moves along with the carriage 6 away from its parked position, indicated in Fig. 1, the circuit wire 10 will be paid out from a spring retracted drum generally indicated at 11, and rewind during the return motion of the carriage. This type of drum may be of the usual construction which embodies a light spring so as to properly function without unduly burdening the cleaner motor, the sole function of the drum being merely to feed out the wire as required and to automatically take up any slack during the return movement of the heater. Obviously this might be replaced by some other means by which the electrical current may be conducted to the resistance element 9 when the heater is traversing the windshield glass. However, with the use of the spring-retracted drum any retarding effect which it may have on the movement of the heater from its parked position will cause said heater to amply warm and thaw the icy coating as it passes thereover so that on the return movement, which is comparatively quick by reason of the accelerating influence of the unwinding drum spring, the wiper will effect a clean wiping action of the glass.

This invention also embodies means by which the heater is not moved from its parked position until it has been energized, thereby avoiding any additional load being placed upon the cleaner motor until the heater is functioning as such. In carrying forward this idea, there is provided in a convenient position within the car, readily accessible to the driver, a switch 12 the handle 13 of which may be moved from the "off" position to the "on" position to complete the electrical circuit through the resistance 9 whereby the latter will immediately become energized and radiate its heat through the surrounding tubular casing 8 onto the coated windshield. The shaft 14, on which the switch handle 13 is mounted, is extended through the windshield frame to the exterior thereof and is equipped with a cam 15 which is designed to normally engage the adjacent end of a coupling lever 16 and adapted to be disengaged therefrom when the switch is turned to circuit-closing position whereby its spring 17 will act to move the opposite end of the lever, which has the coupling head 18 thereon, into engagement with and between the spaced stops or shoulders 19, the latter being carried by the wiper carrier 2. The coupler lever is pivoted on a standard 20 on the carriage 6 so that when the electrical circuit is completed through the resistance 9 the coupler head 18 is simultaneously projected into the recess or space between the said stops 19, providing the wiper carrier 2 is in the position shown in Fig. 1. Should the carrier 2 be in a position away from that shown in Fig. 1 the coupler head will yieldably ride over the forward stop shoulder 19 as said carrier returns to said position shown. But while the carrier is returning to a heater-coupling position said heater is being energized ready for action. With the coupler engaged in its recess between the stops 19, the carriage 6 will then partake of the movements of the carrier 2. In other words, the heater will trail closely behind the wiper 3 as the latter moves toward the left, in Fig. 1, and will immediately precede the wiper 3 upon the return movement. The heater is preferably mounted in sufficient proximity to the exterior surface of the windshield glass to effectively melt or loosen the frozen coating for being scraped or wiped off by the wiper. The tube 8 may, however, be rotatably mounted so as to rotate about the resistance 9 and have rolling contact with the exterior glass surface, if desired.

From the foregoing it will be noted that the cleaner during its normal operation will be unhampered by the presence of the heater; and that the heater will remain in its parked position and inactive until called upon to perform its specific function, which may be only once or twice during the entire year. When it is desired to use or to call the heater into play the resistance is prematurely functioning so as to heat the tube 8 before the actual coupling of the carriage to the carrier takes place, except in the single instance wherein the carrier is in the position indicated in Fig. 1 at the time of the release of the coupler head 18. When it is desired to render the heater inoperative the switch handle is moved from the "on" position to the "off" position which immediately breaks the electrical circuit and moves the cam 15 up into the path of a depending shoulder 21 on the coupler 16 so that when the wiper completes its return stroke said hooked end 21 will engage and ride up over the cam 15 and thereby rock the lever to withdraw the coupler head from its recess or seat. In this connection, the following or succeeding stop 19 is extended downwardly to engage the head 18 after retraction so as to continue to push or move the carriage 6 until the hooked end 21 drops down behind the cam 15 thereby locking the carriage 6 in its parked position while permitting the carrier 2 with its wiper 3 to continue operating in its normal capacity. The retractile effect of the drum 11 further assists in returning and holding the carriage in its parked position, or against a stop 22 on the track 5 which prevents displacement or derailment of the carriage.

I claim as my invention:

1. A windshield cleaner comprising a reciprocatory carrier, a wiper operable thereby, a movably mounted and normally parked heater, and means for coupling the heater to the wiper for movement therewith and while the latter is in operation.

2. A windshield cleaner comprising a wiper, a carrier therefor having a recess therein, a track extending alongside of the path of travel of the wiper, a heater, a carriage operable on the track and supporting the heater, and a coupler on the carriage engageable in the recess of the carrier for effecting unison in movement of the heater and the wiper.

3. A windshield cleaner comprising a wiper, a carrier therefor, a track extending alongside of the path of travel of the wiper and the carrier, a heater, a carriage operable on the track and supporting the heater, coupling means carried by the carriage for coupling the same to the carrier, and means for moving the coupler to its operative position and simultaneously rendering the heater active.

4. In combination with a reciprocatory wiper and means for reciprocating the same, of a movably mounted and normally parked windshield heater, means carried by the heater for coupling the heater for movement with the wiper, and stationarily arranged means for rendering said coupling means inoperative when said heater is in its parked position.

5. In combination with a windshield cleaner motor having a moving part, and a wiper movable by said part, of a movably mounted windshield heater normally parked and connectible to said moving part for movement thereby along with and in proximity to said wiper, and means for connecting the heater to said moving part for movement therewith and in advance of said wiper in one direction of movement thereof.

6. A windshield cleaner comprising a wiper and a wiper-moving part reciprocal over a defined path, a normally parked windshield heater mounted for movement substantially coextensive with said wiper, a coupling part carried by the wiper-moving part, a cooperating coupling part carried by the heater for coupling the heater to said moving part when the first coupling part is moved into a cooperative position with the coupling part of the parked heater, and means not movable with the heater for rendering said coupling parts inoperative upon movement of the heater to a parked position.

7. A windshield cleaner comprising a wiper and a wiper-moving part reciprocal over a definite path, a track extending alongside of said path, a carriage movable back and forth on said track, means for coupling the carriage to said moving part for moving said carriage on its track, and a heater on the carriage for heating the path traversed by said wiper.

8. A windshield cleaner comprising a wiper, a wiper-moving part reciprocal over a definite path, a track adjacent said path, a carriage movable on said track, means including a rockable coupling member for coupling the carriage to said moving part for moving said carriage on its track, a heater carried by the carriage and adapted to ride in proximity to the wiper when the carriage is coupled to said moving part, and means for rendering the heater active.

9. A windshield cleaner comprising a wiper, a wiper-moving part reciprocal over a definite path, a guide alongside of said path, a carriage on said track, means for coupling the carriage to said moving part for movement therewith, an electrical heater mounted on the carriage for movement therewith, means for energizing the heater when the latter is traversing its path, and means for locking the carriage in a parked position when disconnected from the carrier.

10. A windshield cleaner comprising a wiper, a wiper-moving part, a carriage, a guide for the carriage, means for coupling the carriage to said moving part for moving said carriage, a heater mounted on the carriage for movement therewith, means for electrically energizing the heater when moving with the carriage, said means including a circuit wire and a pay-out and take-up device therefor responsive to the movements of the carriage, and means for simultaneously de-energizing the heater and locking the carriage in a parked position.

11. A windshield cleaner embodying a wiper, a wiper-moving part, a movably mounted and normally parked electric heater, means for coupling the heater for movement with the wiper, an electric circuit including the heater and a circuit wire attached thereto, and a spring-retracted drum on which said wire is wound for automatically paying-out and taking-up the wire responsive to the movements of the heater.

12. A windshield cleaner comprising an electric heater, means supporting the same for horizontal movement back and forth across the windshield glass, means for moving the heater on its supporting means, and separate and independent means for mechanically removing the thawed or partially thawed coating from the glass.

13. The combination with a windshield cleaner embodying a wiper-moving part guided for reciprocatory movement, and a wiper movable thereby, of a heater independent of the wiper, means for coupling the heater to the wiper-moving part for movement therewith, and means independent of the guiding means of said wiper-moving part for guiding the heater in its movement therewith.

14. The combination with a windshield cleaner embodying a wiper and a wiper-moving part, of a movably mounted and normally parked heater comprising an electrical resistance, a coupling member carried by the heater and movable from an inoperative to an operative position for coupling the heater to said wiper-moving part, a shifting member for moving the coupling member from its operative position to an inoperative position, a switch for connecting the resistance to a source of energy, and a common control for rendering said shifting member inoperative and simultaneously moving the switch to effect energization of said resistance.

BARTON A. BEAN, Jr.